United States Patent [19]

Nguyen et al.

[11] Patent Number: 4,630,965
[45] Date of Patent: Dec. 23, 1986

[54] APPARATUS FOR SEALING PAVEMENT SEAMS

[75] Inventors: Hung T. Nguyen, Farmers Branch; Vu Q. Dang, Coppell; Henry H. Duval, Jr.; Donald J. Kennedy, both of Dallas, all of Tex.

[73] Assignee: Cleanseal Systems, Inc., Dallas, Tex.

[21] Appl. No.: 691,287

[22] Filed: Jan. 14, 1985

[51] Int. Cl.⁴ .................. E01C 23/09; E01C 19/12
[52] U.S. Cl. .................. 404/107; 222/175; 222/239; 222/611; 222/623; 404/108; 404/113; 425/87; 425/224
[58] Field of Search .................. 425/87, 224, 458; 222/175, 608, 611, 613, 618, 623, 239, 240, 241, 242; 404/107, 108, 113; 114/224

[56] References Cited

U.S. PATENT DOCUMENTS

| | | | |
|---|---|---|---|
| 74,125 | 2/1868 | Pickens | 222/242 |
| 1,015,395 | 1/1912 | Newton | 425/458 |
| 1,835,641 | 12/1931 | Finrock | 222/623 |
| 1,924,636 | 8/1933 | Burket | 404/107 |
| 2,299,352 | 10/1942 | Sergeant | 222/611 |
| 2,535,414 | 12/1950 | Heidger | 222/625 |
| 2,550,303 | 4/1951 | Simpson | 222/624 |
| 2,578,080 | 12/1951 | Middlestadt | 404/107 |
| 3,064,950 | 11/1962 | De Laria | 366/325 |
| 3,130,652 | 4/1964 | Newton et al. | 404/107 |
| 3,280,710 | 10/1966 | Glade | 404/107 |
| 3,469,511 | 9/1969 | Crone | 404/107 |
| 3,873,227 | 3/1975 | Goethe et al. | 404/107 |
| 3,977,655 | 8/1976 | Okabayashi et al. | 366/325 |

Primary Examiner—Willard E. Hoag
Attorney, Agent, or Firm—Hubbard, Thurman, Turner & Tucker

[57] ABSTRACT

Apparatus for sealing pavement joints or seams are disclosed. The apparatus includes a wheeled support platform which serves to mount a cylindrical storage container suitable for holding a selected amount of an asphaltic emulsion sealing composition. An applicator is coupled to the bottom of the storage container and controls are provided to selectively vary the volume of the stream of sealing composition and to permit the stream to be completely extinguished. In order to prevent the asphaltic emulsion sealing composition from breaking down or settling out during application an agitator device is provided which propels the sealing composition upward from the bottom of the storage container and mixes the sealing composition. In a preferred embodiment of the present invention the agitator device is gear driven in response to movement of the wheeled support platform.

11 Claims, 2 Drawing Figures

APPARATUS FOR SEALING PAVEMENT SEAMS

BACKGROUND OF THE INVENTION

This invention relates to apparatus for sealing pavement joints or seams in general and in particular to apparatus for sealing pavement seams which do not require the utilization of sealing materials which must be heated to predetermined temperatures to achieve molten states. Still more particularly, this invention relates to sealing compositions for use in such devices which have enhanced operating characteristics.

It is well known in the prior art that when large expanses of concrete are poured and allowed to harden over a relatively dynamic base, such as clay soil, subsequent movement of that base will result in fractures and cracks in the concrete. These fractures and cracks are due to temperature and moisture gradients which exist in the concrete due to the differences between the temperature and moisture content of the top and the bottom of a pavement slab and to shrinkage which occurs during curing. In an effort to direct such fractures and cracks along less damaging lines, it has become common practice to produce seams in such concrete expanses by cutting or sawing the concrete after hardening, or by utilizing some flexible material which is embedded in the concrete while it is in a plastic state. The utilization of sawed or cut seams is most prevalent in this area, particularly in applications such as parking lots and streets or highways.

It has also become known in the art that some form of flexible sealant must be inserted into such seams to stem the increased flow of surface water into the base beneath these seams. The sealant utilized must be capable of standing repeated expansion and contraction as the pavement expands and contracts with temperature and moisture changes. This is particularly important in areas where the soil contains a high clay content as the surface water which flows through such seams will result in a significant expansion of the subsurface soils and have a particularly deleterious effect of the stability of the concrete. Thus, it has become necessary to seal these concrete seams with a waterproof material to prevent damage to the concrete structure. Further, the sealant material must preferably be contained entirely within the seam or gap to prevent its removal if it adheres to the tires of vehicles passing over the seam.

Prior art solutions to this problem have consisted almost entirely of expensive and difficult to install plastic materials or heated asphaltic materials which are difficult and dangerous to utilize. Numerous examples of devices which utilize asphaltic materials and an accompanying heating device abound in the art. The difficulty in utilizing a heated mass of asphalt and accurately applying such materials into a narrow gap has generally been well recognized; however, no acceptable alternative has been proposed. Thus, while this technique is quite dangerous, it has remained the primary method of sealing pavement seams.

Recently, certain asphaltic emulsion sealing materials have been proposed for utilization in the sealing of pavement seams; however, these materials suffer from several serious drawbacks. Many of these materials harden when exposed to air and this makes it quite difficult to apply them into a pavement seam without premature curing. Additionally, many of the emulsion materials suffer from premature breakdown or lumping during utilization and this therefore renders the application of these materials to a narrow pavement seam quite difficult.

SUMMARY OF THE INVENTION

It is therefore one object of the present invention to provide an improved apparatus for sealing pavement joints or seams.

It is another object of the present invention to provide an improved apparatus for sealing pavement joints or seams which does not require a heated mass of sealant compound.

It is yet another object of the present invention to provide an apparatus for effectively sealing pavement joints or seams with an emulsion sealant composition which cures after installation.

It is still another object of the present invention to provide an improved sealing composition for use in sealing pavement joints or seams.

The foregoing objects are achieved as is now described. The apparatus of the present invention includes a wheeled support platform which serves to mount a cylindrical storage container suitable for holding a selected amount of an asphaltic emulsion sealing composition. In a preferred mode of the present invention, the asphaltic emulsion sealing composition is enhanced in its operating characteristics by the addition of certain salts and stabilizing ingredients. An applicator is coupled to the bottom of the storage container and controls are provided to selectively vary the volume of the stream of sealing composition and to permit the stream to be completely extinguished. In order to prevent the asphaltic emulsion sealing composition from gelling or breaking down during application an agitator device is provided which propels the sealing composition upward from the bottom of the storage container and mixes the sealing composition. In a preferred embodiment of the present invention the agitator device is gear driven in response to movement of the wheeled support platform.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
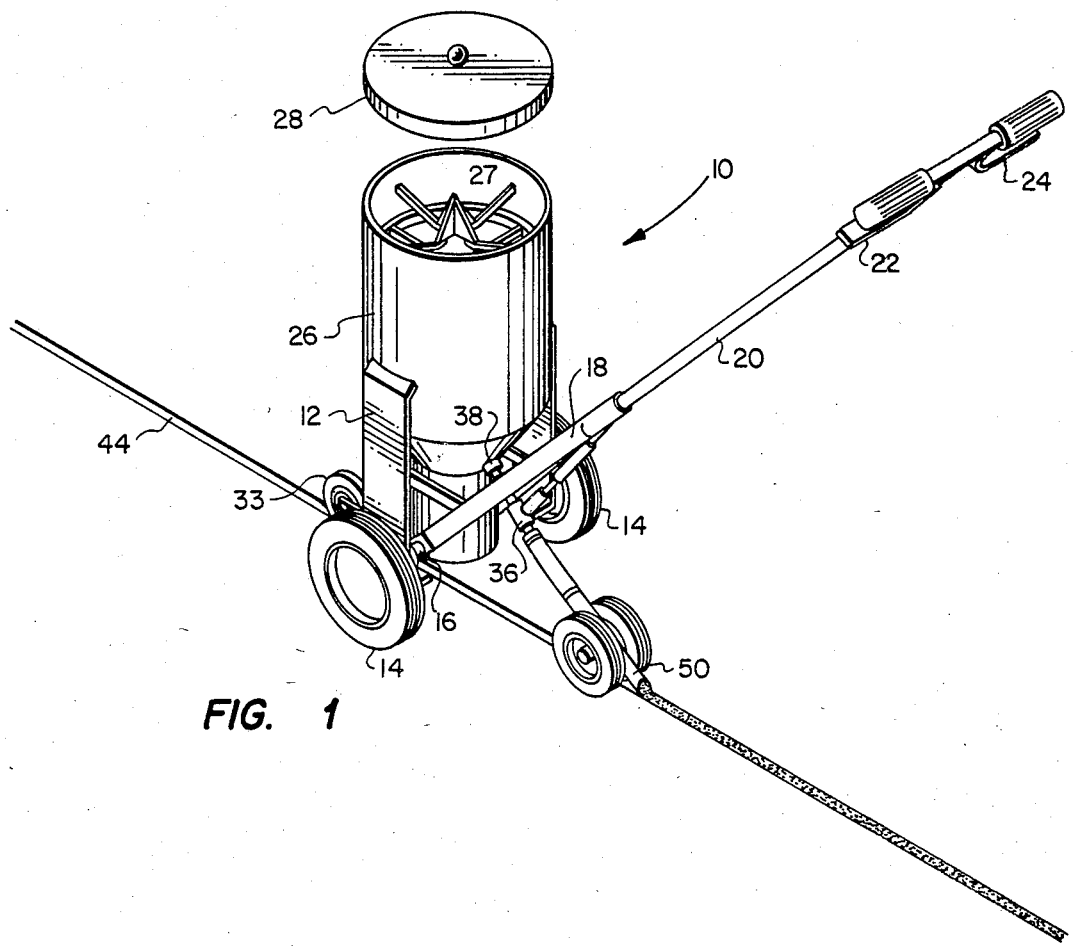
FIG. 1 is a perspective view of the novel pavement joint sealing apparatus of the present invention.

With reference now to the figures and in particular with reference to FIG. 1, there is depicted a perspective view of the novel pavement seam sealing apparatus of the present invention. As can be seen, pavement seam sealing apparatus 10 of the present invention includes a wheeled support platform 12 having two wheels 14 coupled to a single axle 16. Wheeled support platform 12 includes mounting beams 18 which serve to mount operator handle 20 which may be utilized to propel pavement seam sealing apparatus 10 manually.

Mounted to operator handle 20 are two control handles 22 and 24. Control handles 22 and 24 are utilized to control the volume of sealant composition flow as will be explained herein. As can be seen, pavement seam sealing apparatus 10 may be propelled manually along a pavement surface having a seam 44 which is preferably cut into the pavement surface. Seam 44 generally includes a length of jute or other fibrous material which is inserted prior to the application of an asphaltic sealing composition.

A sealant storage container 26 is mounted to wheeled support platform 12 and serves to contain a selected amount of a preferred asphaltic emulsion sealing composition. A preferred embodiment of this asphaltic emulsion sealing composition comprises emulsified asphalt mixed with between two and twenty percent latex emulsion (for resilience) and about one and one-half percent of selected salts and stabilizing ingredients.

It is well known in the art that the addition of certain salts to emulsify an asphalt will stabilize the resultant mixture (see U.S. Pat. No. 3,220,953); however, in order to efficiently utilize emulsified asphalt as a pavement seam sealing composition it is necessary to enhance the resultant composition to prevent premature breakdown and lumping.

The novel sealing composition of the present invention is created by heating emulsified asphalt to a temperature above one hundred degrees Fahrenheit and adding between two and twenty percent weight of latex emulsion. The resultant mixture is then allowed to cool to below eighty degrees Fahrenheit. Next, a stabilizing mixture of NaOH, NH4, isopropyl alcohol and glyceride is prepared. The stabilizing mixture includes approximately eighty-three percent weight of a fifty percent solution of NaOH, five percent weight of a one percent solution of NH4, seven percent weight of isopropyl alcohol and five percent weight of glyceride. The ingredients are prepared as follows: first, the alcohol and glyceride are combined. Next, the NH4 is added and the resultant mixture is added to the NaOH solution. Finally, an amount of the resultant stabilizing mixture equal to approximately one and one-half percent weight is added to the asphalt latex emulsion mixture and mixed slowly for ten to fifteen minutes. A high shear mixture is then utilized to achieve a smooth blend of ingredients. The resultant composition is fixotropic in nature and will achieve a liquid state in response to agitation; however, in the absence of sufficient agitation the composition will begin to gel.

Referring again to the apparatus of FIG. 1, it can be seen that coupled to the bottom of sealant storage container 26 is outlet conduit 38 which passes through control valve 36 to applicator 50. Control valve 36 is operated by control handle 22 and serves to vary the volume of flow of asphaltic emulsion sealing composition through applicator 50 in a manner well known in the art. Similarly, control valve 36 may also be operated by control handle 24 and serves to shut off the flow of asphaltic emulsion sealing composition through applicator 50.

Also depicted in FIG. 1 is guide wheel 33 which may be inserted into seam 44 to guide the movement of apparatus 10. In a preferred embodiment of the present invention, guide wheel 33 may be spring loaded downward to ensure that it remains within seam 44.

Figure 2:
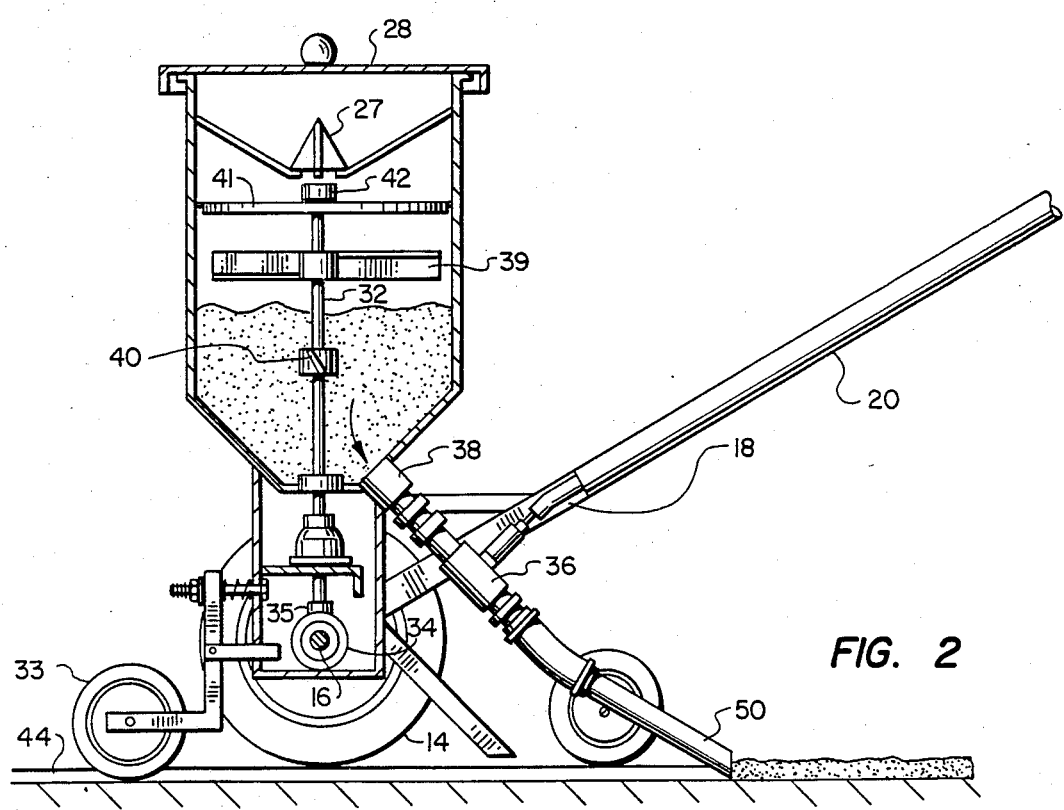
FIG. 2 is a partially sectional view of the applicator of the novel joint sealing apparatus of the present invention.

An important feature of pavement seam sealing apparatus 10 which serves to prevent premature gelling of the asphaltic emulsion sealing composition is agitator 40 and stirrer 39 (see FIG. 2) which are mounted to a shaft 32. Shaft 32 may be unmounted at its upper end or may be mounted as depicted in FIG. 2, within bushing 42 of brace 41. As can be seen in FIG. 1, apparatus 10 includes a cover 28 and preferably includes a piercing member 27 which may be utilized to rupture a flexible bag containing the sealing composition of the present invention.

The operation of agitator 40 and stirrer 39 may be illustrated more easily by reference to FIG. 2 which depicts a partially sectional view of pavement seam sealing apparatus 10 of the present invention. As can be seen, axle 16 passes through gear members 34 and 35 which serve to convert the rotary action of axle 16 into rotary motion of shaft 32, displaced ninety degrees from axle 16. This may also be accomplished utilizing any one of several gear combinations as is well known in the prior art. Thus, if wheels 14 are keyed to axle 16 and pavement seam sealing apparatus 10 is manually propelled, axle 16 will rotate in conjunction with the rotation of wheels 14 and shaft 32 will also rotate due to the action of gear members 34 and 35.

The rotation of shaft 32 serves to continuously agitate the asphaltic emulsion sealing composition in a novel manner. Agitator 40 is constructed utilizing a propeller design having a selected pitch which is mounted in a manner which will propel the asphaltic emulsion sealing composition upward within sealant storage container 26 in response to a rotation of shaft 32 which corresponds to forward motion of pavement seam sealing apparatus 10. In this manner, the asphaltic emulsion sealing composition is continually agitated and stirred during operation of pavement seam sealing apparatus 10 in a fashion which will maintain the fixotropic emulsion in a liquid state.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An apparatus for filling the gap between pavement sections with an asphaltic emulsion sealing composition comprising:

a wheeled support platform;

a storage container disposed on said wheeled support platform for containing an asphaltic emulsion sealing composition;

applicator means coupled to a bottom portion of said storage container for coupling a stream of said asphaltic emulsion sealing composition into said gap between pavement sections; and means for preventing gelling of said asphaltic emulsion sealing composition in response to movement of said wheeled support platform, said means for preventing gelling comprising a substantially vertically disposed rotatable shaft in said container driveably connected to said wheeled support platform;

said shaft having a first agitator disposed within the bottom portion of said container for propelling asphaltic emulsion upward from the bottom of said container, and a second stirring means disposed above said first agitator for stirring said asphaltic emulsion.

2. The apparatus for filling the gap between pavement sections according to claim 1 wherein said wheeled support platform includes two wheels disposed on and keyed to a single axle.

3. The apparatus for filling the gap between pavement sections according to claim 1 further including regulator means disposed within said applicator means for selectively starting and stopping said stream of asphaltic emulsion sealing composition.

4. The apparatus for filling the gap between pavement sections according to claim 3 wherein said regulator means further includes means for varying said stream of said asphaltic emulsion sealing composition.

5. An apparatus for filling the gap between pavement sections comprising:
a wheeled support platform;
a storage container disposed on said wheeled support platform for containing an asphaltic emulsion sealing composition;
applicator means coupled to a bottom portion of said storage container for coupling a stream of said asphaltic emulsion sealing composition into said gap between pavement sections;
two agitator means spaced one above the other, said first agitator disposed within said bottom portion of said storage container for propelling said asphaltic emulsion sealing composition upward and said second agitator disposed above said first agitator for stirring said asphaltic emulsion sealing composition propelled upward by said first agitator; and
drive means for operating said agitator means and said stirring means in response to movement of said wheeled support platform.

6. The apparatus for filling the gap between pavement sections according to claim 5 wherein said wheeled support platform includes two wheels disposed on and keyed to a single axle.

7. The apparatus for filling the gap between pavement sections according to claim 5 wherein said first agitator comprises a propeller having a selected pitch for propelling said asphaltic emulsion sealing composition upward in response to operation thereof.

8. The apparatus for filling the gap between pavement sections according to claim 5 further including regulator means disposed within said applicator means for selectively starting and stopping said stream of asphaltic emulsion sealing composition.

9. The apparatus for filling the gap between pavement sections according to claim 8 wherein said regulator means further includes means for varying said stream of said asphaltic emulsion sealing composition.

10. The apparatus for filling the gap between pavement sections according to claim 5 wherein said two agitator means are coupled to a common shaft.

11. The apparatus for filling the gap between pavement sections according to claim 10 wherein said common shaft is driven through a gear mechanism driven by movement of said wheeled support platform.

* * * * *